(12) United States Patent
Chang

(10) Patent No.: US 10,072,998 B2
(45) Date of Patent: Sep. 11, 2018

(54) MULTI-ANGLE PRESSURE SENSOR

(71) Applicant: HON HAI PRECISION INDUSTRY CO., LTD., New Taipei (TW)

(72) Inventor: Jen-Tsorng Chang, New Taipei (TW)

(73) Assignee: MiiCs & Partners (Shenzhen) Co., Ltd., Shenzhen (CN)

( * ) Notice: Subject to any disclaimer, the term of this patent is extended or adjusted under 35 U.S.C. 154(b) by 38 days.

(21) Appl. No.: 14/951,652

(22) Filed: Nov. 25, 2015

(65) Prior Publication Data

US 2016/0349131 A1    Dec. 1, 2016

(30) Foreign Application Priority Data

May 29, 2015    (CN) .......................... 2015 1 0285236

(51) Int. Cl.
*G01L 9/00* (2006.01)
*G01L 5/22* (2006.01)
*G01L 5/16* (2006.01)

(52) U.S. Cl.
CPC .......... *G01L 9/0058* (2013.01); *G01L 9/0072* (2013.01); *G01L 5/165* (2013.01); *G01L 5/228* (2013.01)

(58) Field of Classification Search
CPC ... G01L 9/0072; G01L 9/0073; G01L 9/0075; G01L 9/0058; G01L 5/165; G01L 5/228; G01L 9/12; G01L 9/0001; G01L 5/161; G01L 5/16; G01L 5/0052; G01L 5/0061; G01L 5/0028; G01L 5/00; G01L 5/06; G01L 5/10; G01L 5/107; G01L 5/0033; G01L 1/04; G01L 5/0071; G01N 13/02; G01N 2013/0291; B01L 3/5085

USPC ............ 73/718, 724, 64.49, 862.471, 862.53
See application file for complete search history.

(56) References Cited

U.S. PATENT DOCUMENTS

| | | | | |
|---|---|---|---|---|
| 4,047,425 A * | 9/1977 | Handy | ..................... | G01N 3/08 73/804 |
| 5,209,126 A * | 5/1993 | Grahn | ..................... | G01L 1/247 73/862.046 |
| 6,376,759 B1 * | 4/2002 | Suzuki | ................... | G10H 1/053 84/615 |
| 8,966,997 B2 * | 3/2015 | Taylor | ....................... | B32B 5/26 73/862.041 |
| 9,349,551 B2 * | 5/2016 | Nakajima | ............. | G06F 3/0202 |

(Continued)

*Primary Examiner* — John Fitzgerald
*Assistant Examiner* — Truong D Phan
(74) *Attorney, Agent, or Firm* — ScienBiziP, P.C.

(57) ABSTRACT

A pressure sensor able to value touch pressures at oblique angles includes a substrate base, a deformable substrate disposed on the substrate base, and a carbon nanometer layer disposed on the deformable substrate. A cover plate is disposed on the carbon nanometer layer, and two flexible power circuit boards electrically connect the carbon nanometer layer to the substrate base. The device includes a processor. The substrate base includes a substrate and a pad. The pad is located between the substrate and the deformable substrate. The deformable substrate and the cover plate are made of elastic materials. The processor calculates lateral pressures based on the resistance variation value due to the vertical deformation of the carbon nanometer layer and the capacitance variation value between the carbon nanometer layer and the pads when an external physical resistance is experienced as a force applied to the cover plate.

12 Claims, 6 Drawing Sheets

(56) References Cited

U.S. PATENT DOCUMENTS

| | | | |
|---|---|---|---|
| 2006/0045453 A1* | 3/2006 | Park | G02B 6/443 385/128 |
| 2007/0037914 A1* | 2/2007 | Heck | C08L 23/12 524/451 |
| 2007/0164632 A1* | 7/2007 | Adachi | A61B 8/4483 310/311 |
| 2007/0219319 A1* | 9/2007 | Saegusa | C08F 265/04 525/100 |
| 2010/0101079 A1* | 4/2010 | Lee | H05K 13/0417 29/700 |
| 2010/0290748 A1* | 11/2010 | Kojima | G02B 6/4416 385/114 |
| 2011/0083517 A1* | 4/2011 | Muroyama | B25J 13/084 73/862.046 |
| 2012/0088901 A1* | 4/2012 | Aiyar | C08J 5/2256 528/380 |
| 2012/0092350 A1* | 4/2012 | Ganapathi | G02B 26/0833 345/501 |
| 2012/0108739 A1* | 5/2012 | Ishikawa | C08K 5/005 524/588 |
| 2013/0082970 A1* | 4/2013 | Frey | G06F 3/0414 345/173 |
| 2013/0091961 A1* | 4/2013 | Taylor | B32B 5/26 73/862.541 |
| 2013/0184555 A1* | 7/2013 | Chen | A61B 5/0088 600/407 |
| 2014/0140668 A1* | 5/2014 | Morioka | G02B 6/2555 385/95 |
| 2015/0002452 A1* | 1/2015 | Klinghult | G06F 3/0416 345/174 |
| 2016/0033343 A1* | 2/2016 | Park | G01L 1/205 73/862.046 |
| 2016/0253019 A1* | 9/2016 | Geaghan | G06F 3/041 345/174 |

* cited by examiner

MULTI-ANGLE PRESSURE SENSOR

FIELD

The subject matter herein generally relates to materials handling.

BACKGROUND

In the field of robotic applications, a pressure sensor is touch sensitive. The pressure sensor is mainly used for measuring the applied vertical contact pressure and not for measuring the lateral pressure. The development of robots needs to increase the touch sensitivity to simulate the touch sense of a human being. The pressure sensor needs to detect the contact force and distinguish between vertical and lateral pressures to obtain a good tactile feedback.

BRIEF DESCRIPTION OF THE DRAWINGS

Implementations of the present technology will now be described, by way of example only, with reference to the attached figures.

DETAILED DESCRIPTION

Figure 1:
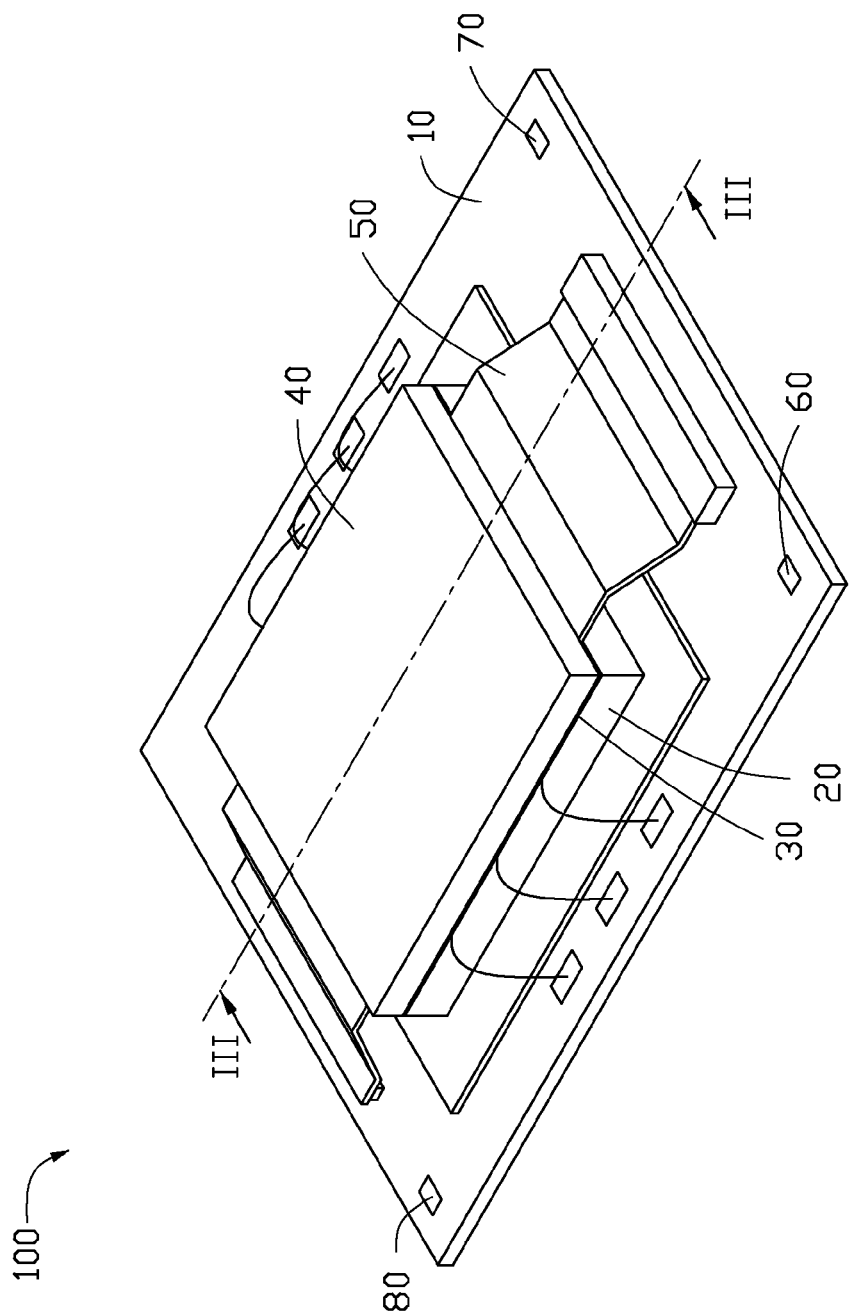
FIG. 1 is an isometric view of a pressure sensor according to a first embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

FIG. 1 illustrates a pressure sensor 100 which includes a substrate base 10, a deformable substrate 20, a carbon nanotube layer 30, a cover plate 40, two flexible circuit boards 50, a resistance measurement device 60, a capacitance measurement device 70, and a processor 80. The deformable substrate 20 is disposed on the substrate base 10. The cover plate 40 covers the deformable substrate 20. The carbon nanotube layer 30 is positioned between the deformable substrate 20 and the cover plate 40.

Figure 2:
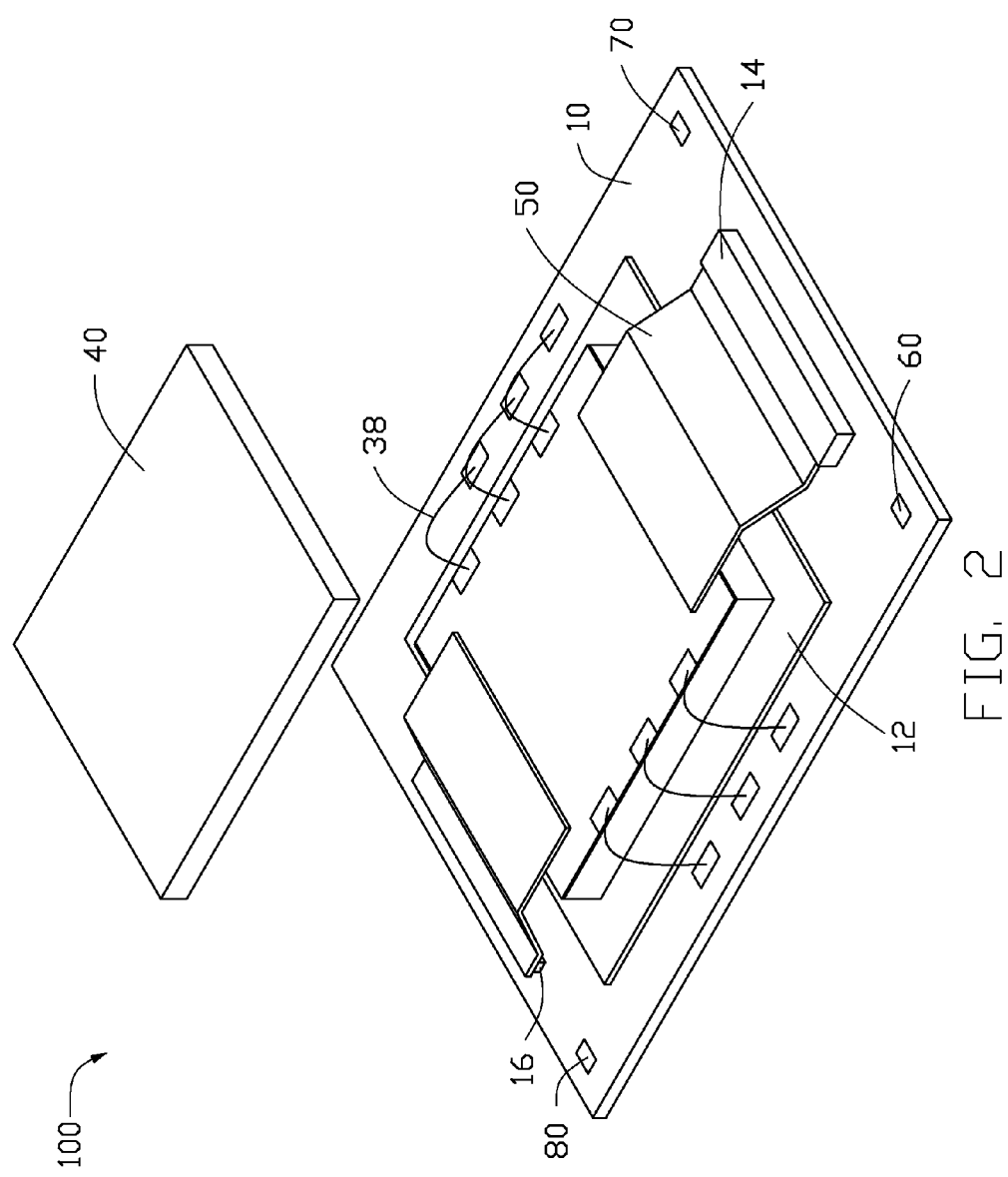
FIG. 2 is an isometric exploded view of the pressure sensor in FIG. 1.

FIG. 2 illustrates the cover plate 40 separated from the pressure sensor 100 and the two flexible circuit boards 50 attached to the carbon nanotube layer 30.

Figure 3:
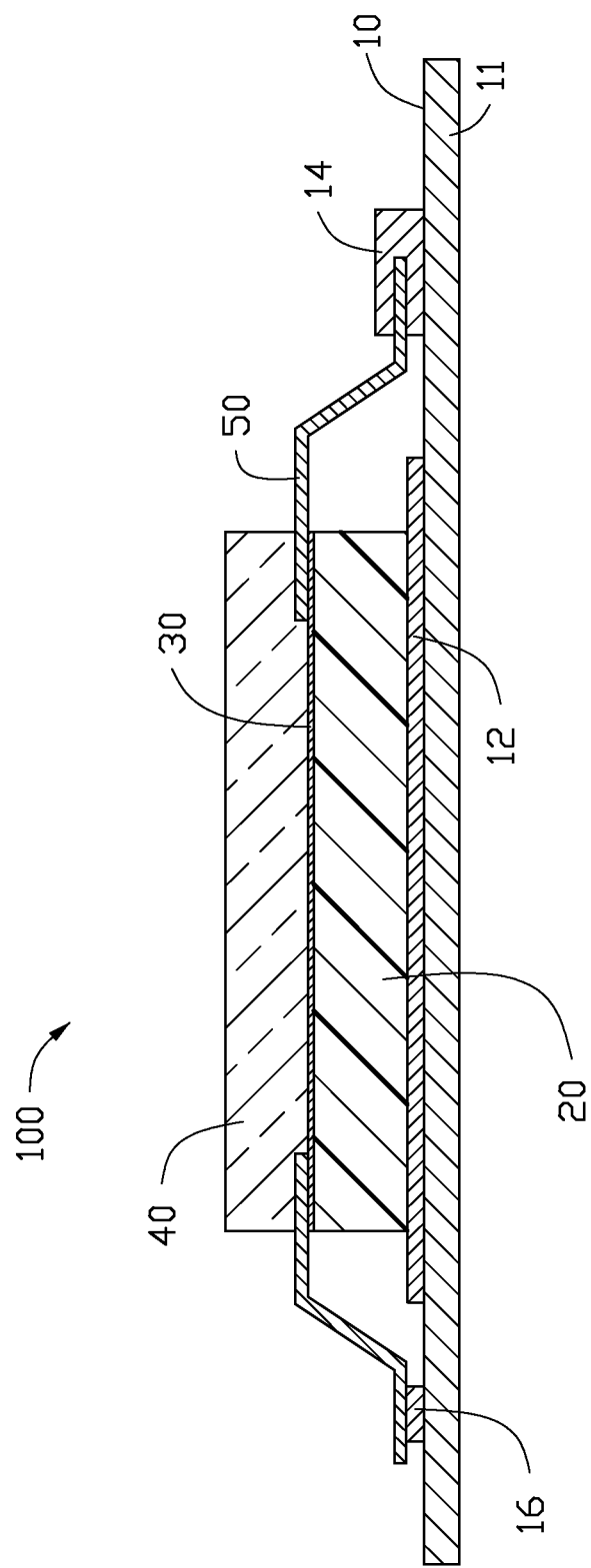
FIG. 3 is a cross-sectional view of the pressure sensor along the line in FIG. 1.

FIG. 3 illustrates a cross-section of the pressure sensor 100. Referring to FIG. 2 and FIG. 3, the substrate base 10 includes a substrate 11, a solder pad 12, a connector 14, and a plurality of solder joints 16. The solder pad 12, the connector 14, and the solder joints 16 are disposed on the substrate 11. The substrate 11 is a rectangular parallelepiped structure. The substrate 11 can be a rigid circuit board made of a flame resistant material, a glass substrate with circuit wires, or a ceramic substrate with circuit wires. In at least one embodiment, the substrate 11 is a rigid circuit board made of a flame resistant material. The solder pad 12 has a rectangular structure. The solder pad 12 is located at a central position of the substrate 11. The connector 14 and the solder joints 16 are located at opposite ends of the solder pad 12. The connector 14 is an elongated structure. Each solder joint 16 forms a straight line.

The deformable substrate 20 is made of elastic and dielectric materials, such as polydimethylsiloxane (PDMS), silicone resin, or rubber. The deformable substrate 20 is bonded on the solder pad 12.

Figure 4:
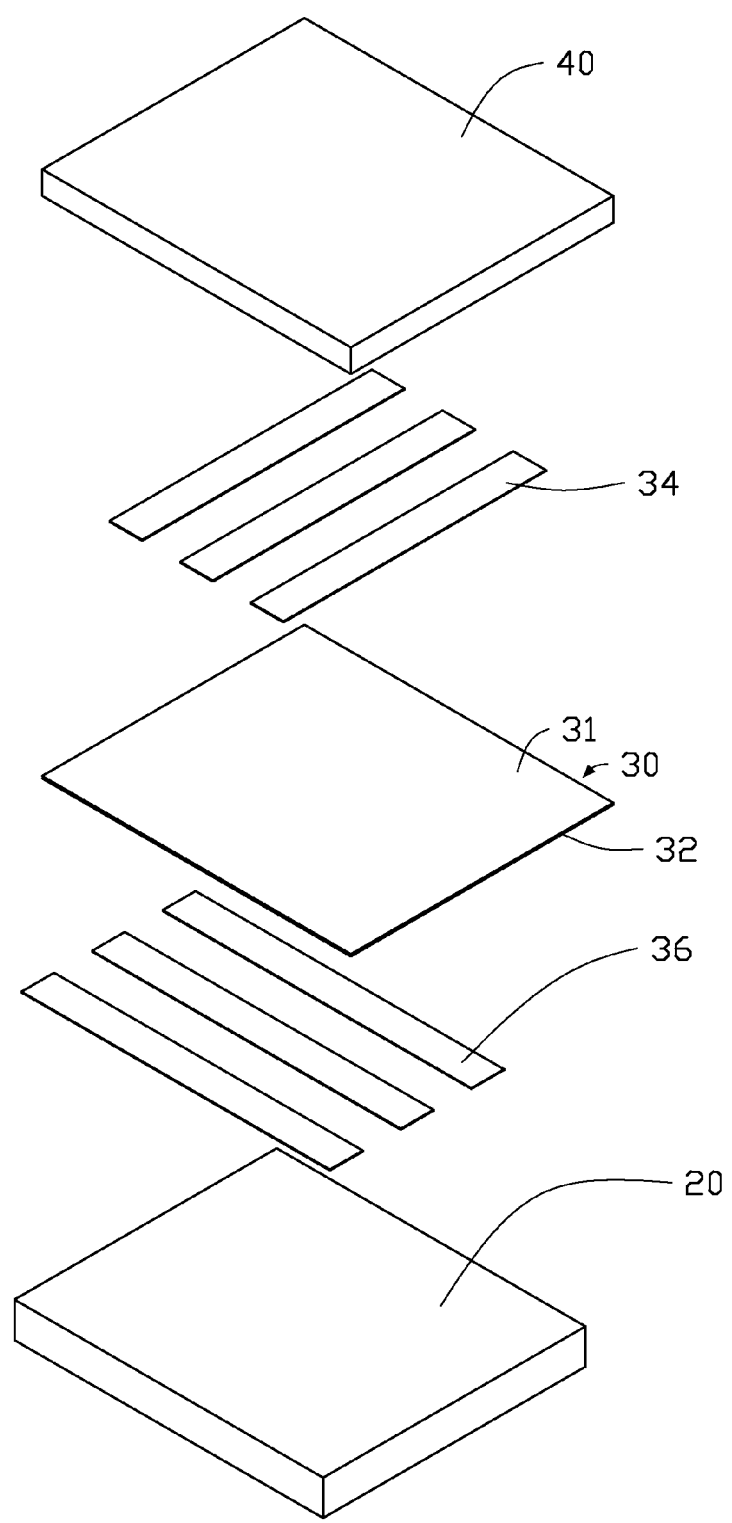
FIG. 4 is an isometric exploded view of the pressure sensor in FIG. 1.

As FIG. 4 illustrates, the carbon nanotube layer 30 has a rectangular parallelepiped structure. The carbon nanotube layer 30 includes an upper surface 31, a lower surface 32 opposed to the upper surface 31, a plurality of parallel metallic column electrodes 34 patterned on the upper surface 31, and a plurality of parallel metallic row electrodes 36 patterned on the lower surface 32. The thickness of each of the parallel metallic column electrodes 34 is 25 microns to 65 microns and the thickness of each of the parallel metallic row electrodes 36 is 25 microns to 65 microns. The distance between each of the parallel metallic column electrodes 34 and each of the parallel metallic row electrodes 36 is constant.

The carbon nanotube layer 30 is a thin film made of a composite material. The composite material is made by a polymer matrix material and carbon nanotubes. The carbon nanotubes are uniformly distributed in the polymer matrix material (not shown). The mass ratio of the carbon nanotubes to the polymer matrix material is (0.1~15):100. The polymer matrix material can be a dimethyl siloxane or a styrene-butadiene-styrene block co-polymer. The carbon nanotubes can be single-wall carbon nanotubes or multi-walled carbon nanotubes.

The parallel metallic column electrodes 34 and the parallel metallic row electrodes 36 are spaced so as to perpendicularly intersect. The overlapping portions of each parallel metallic column electrode 34 and parallel metallic electrode 36 within the spaced perpendicularly intersecting region and the part of the carbon nanotubes within the spaced perpendicularly intersecting region constitute a pressure sensor unit of the pressure sensor 100.

As mentioned above, the carbon nanotube layer 30 is positioned between the deformable substrate 20 and the cover plate 40. The carbon nanotube layer 30 includes the upper surface 31 and the lower surface 32. Therefore, the upper surface 31 and the lower surfaces 32 are respectively in contact with the cover plate 40 and the deformable substrate 20. The lower surface 32 of the carbon nanotube layer 30 and the deformable substrate 20 completely overlap. In addition, the cover plate 40 covers the upper surface 31 of the carbon nanotube layer 30. The cover plate 40 and the upper surface 31 of the carbon nanotube layer 30 are also completely overlapped. In at least one embodiment, the cover plate 40 is a rectangular parallelepiped structure. The cover plate 40 can be made of elastic materials, such as polyethylene terephthalate, ultra-thin glass, or a soft coating.

Referring to FIG. 2 and FIG. 4, each of the parallel metallic row electrodes 36 is electrically connected to the substrate 11 through metal wires 38, and each of the parallel metallic column electrodes 34 is also electrically connected to the substrate 11 via metal wires 38.

The two flexible circuit boards 50 are located at opposite sides of the carbon nanotube layer 30. One end of each flexible circuit board 50 is electrically connected to the upper surface 31 of the carbon nanotube layer 30, and the other end of each flexible circuit boards 50 is electrically connected to the connector 14 or the solder joints 16.

The resistance measurement device 60, the capacitance measurement device 70, and the processor 80 are disposed on the substrate 11 and electrically connected to the substrate 11. The resistance measurement means 60 measures the variations in resistance due to the vertical deformation of the carbon nanotube layer 30 positioned between the parallel metallic column electrode 34 and the parallel metallic row electrode 36. The capacitance measurement means 70 measures the variations in capacitance between the carbon nanotube layer 30 and the solder pad 12. The external physical pressure can be divided into two orthogonal components, that is, a vertical pressure perpendicular to the cover plate 40, and a lateral pressure parallel to the cover plate 40. The processor 80 calculates the lateral pressure (as a result of touch) exerted on the pressure sensor 100 in accordance with the two values of the variations.

Figure 5:
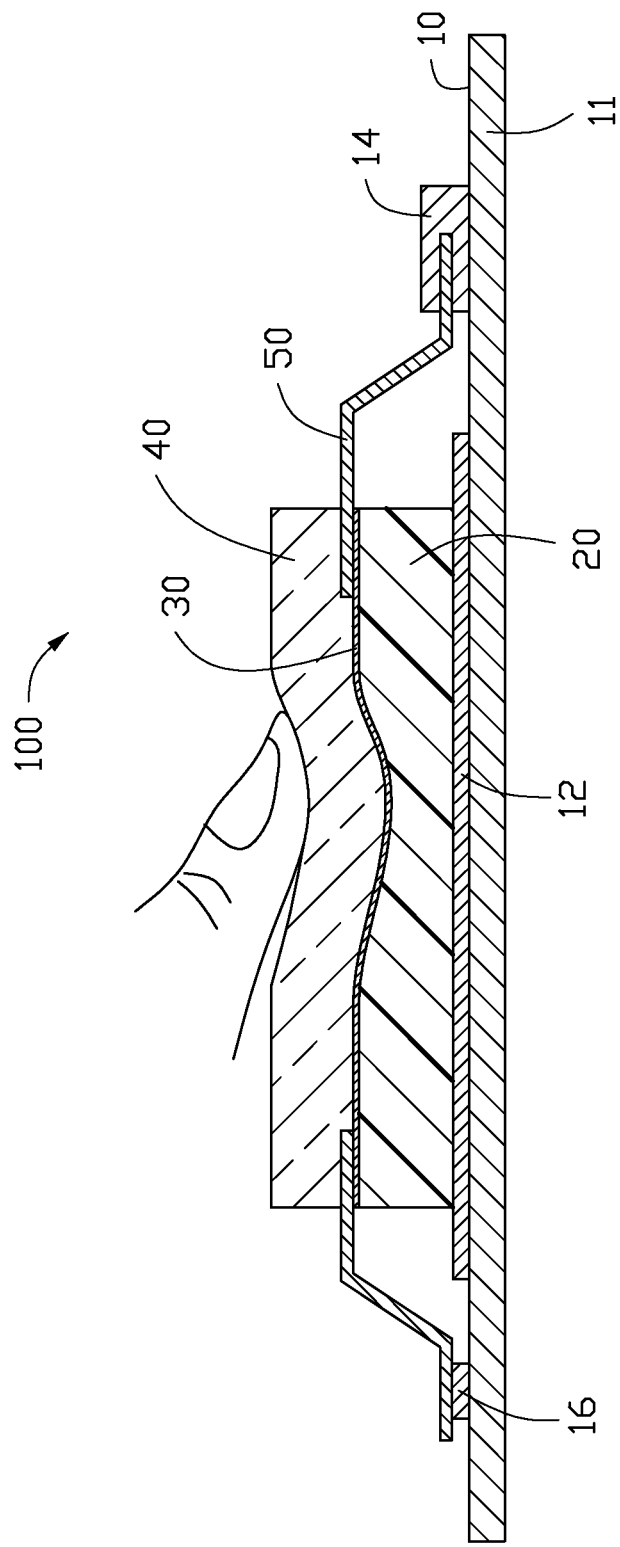
FIG. 5 is a cross-sectional view of the pressure sensor in FIG.1 being pressured.

FIG. 5 illustrates the carbon nanotube layer 30 and the deformable substrate 20 being deformed through the cover plate 40 when the cover plate 40 experiences the physical pressure of an external contact. As mentioned above, the parallel metallic column electrodes 34 and the parallel metallic row electrodes 36 are respectively patterned on the upper surface 31 and the lower surface 32 of the carbon nanotube layer 30. The parallel metallic column electrodes 34 and the parallel metallic row electrodes 36 are spaced and perpendicularly intersect. The carbon nanotubes of the carbon nanotube layer 30 within the spaced perpendicularly intersecting region constitute a part of pressure sensor unit of the pressure sensor 100. When an external physical pressure is experienced by the cover plate 40, the external physical pressure is transmitted to the pressure sensor unit, the gaps and contact status between the carbon nanotubes of the carbon nanotube layer 30 are accordingly changed. This results in a change of the resistance network structure formed by the carbon nanotubes of the carbon nanotube layer 30. The macro resistance of the pressure sensor unit at the point of contact of the external physical pressure is changed. The resistance measurement device 60 is used for measuring the resistance variation value between the parallel metallic column electrode 34 and the parallel metallic row electrodes 36. The capacitance measurement means 70 is used for measuring the capacitance variation value between the carbon nanotube layer 30 and the solder pad 12. The processor 80 first calculates the vertical pressure, $F_v$, of the carbon nanotube layer 30 in accordance with the above resistance variation value measured by the resistance measurement device 60 when the external physical pressure is experienced on the cover plate 40 of the pressure sensor 100. The processor 80 then calculates the lateral pressure, $F_L$, based on the capacitance variation value and the vertical pressure to obtain the direction and magnitude of the lateral pressure.

The calculation method is described below. The capacitance is calculated as $$C = \varepsilon \cdot S/d, \quad (1)$$

where $\varepsilon$ is the dielectric constant of the medium between the carbon nanotube layer 30 and the solder pad 12, S is the area of the carbon nanotube layer 30, and d is the distance between the carbon nanotube layer 30 and the solder pad 12. Therefore, $$\Delta C = \varepsilon \cdot S \cdot (1/d - 1/[d - \Delta d]); \quad (2)$$

where $\Delta C$ is the capacitance variation value between the carbon nanotube layer 30 and the solder pad 12, S is the area of the carbon nanotube layer 30, d is the distance between the carbon nanotube layer 30 and the solder pad 12, and $\Delta d$ is the distance variation value of the carbon nanotube layer 30 and the solder pad 12.

The distance variation value between the carbon nanotube layer 30 and the solder pad 12 can be obtained through the capacitance variation value $\Delta C$.

Figure 6:
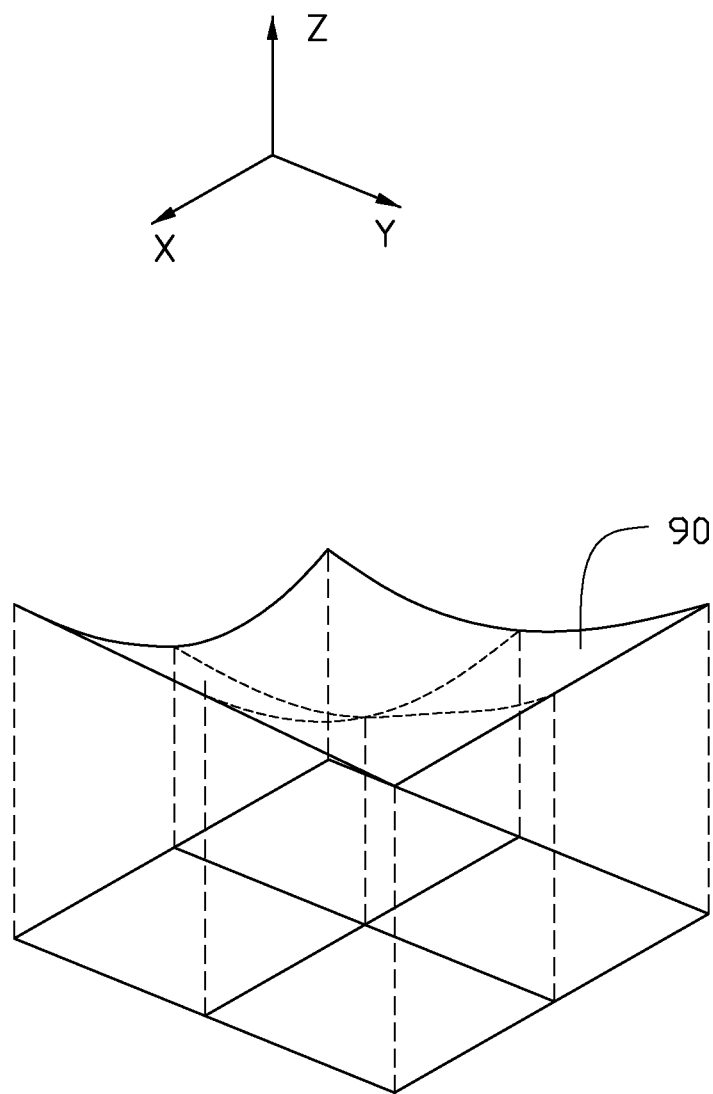
FIG. 6 is a cubic representation of a partial area of the pressure sensor in FIG. 5.

FIG. 6 illustrates a pressure sensing area of the pressure sensor 100 having different distance variation values when the external physical pressure is experienced on the pressure sensor 100 shown in FIG. 5. The pressure sensing area is divided into four square areas with the same size and shape. The coordinates of the nine end points of the four square areas are (0,0), (0,1), (1,0), (−1,0), (0,−1), (1,1), (1,−1), (−1,1) and (−1,−1). The coordinates of the central point of the pressure sensing area is (0,0). $\Delta C$ can be calculated by the $\Delta d$ which corresponds to the height of the nine points coordinates in FIG. 6.

The coordinates of the nine end points are substituted into an equation, $$d_i = F_i(x, y) = A_0 x^2 + B_0 y^2 + C_0 x + D_0 y + E_0, \quad (3)$$

where $A_0$, $B_0$, $C_0$, $D_0$ and $E_0$ are five unknown numbers. After calculations, $A_1$, $B_1$, $C_1$, $D_1$ and $E_1$ can be obtained as a solution of $A_0$, $B_0$, $C_0$, $D_0$ and $E_0$. A trajectory equation for calculating the trajectory 90 of each point of the pressure sensing area can then be obtained, the trajectory equation is:

$$F_i(x,y) = A_1 x^2 + B_1 y^2 + C_1 x + D_1 y + E_1 \quad (4)$$

The tangent equation of the trajectory equation (4) is derived from:

$$F_i'(x,y) = 2A_1 x + 2B_1 y + C_1 + D_1 \quad (5)$$

The slope k of the tangent line can be obtained from the tangent equation (5);

$$k = \tan \alpha = -B_1/A_1 \quad (6)$$

where $\alpha$ is in the Cartesian coordinate system of the tilt angle of the tangent equation (5).

Thus, the magnitude and direction of the lateral pressure $F_L$ can be drawn by $\tan \alpha$ and the vertical pressure, $F_v$.

$$F_L = -A_1/B_1 \cdot F_v$$

Thus the processor 80 can calculate the magnitude of the vertical pressure based on the resistance variation value perpendicular to the carbon nanotube layer 30. After obtaining the vertical pressure, the processor 80 can calculate the lateral pressure exerted on the cover plate 40 of the pressure sensor 100 based on the capacitance variation value and the vertical pressure. Thus, the pressure sensor 100 can measure the lateral pressure. The robot utilizing the sensor 100 can have a good tactile feedback.

The embodiments shown and described above are only examples. Many details are often found in the art such as the other features of a pressure sensor. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A pressure sensor comprising:
    a substrate base comprising a substrate and a solder pad;
    a deformable substrate disposed on the substrate base and being made of one or more elastic and dielectric materials, wherein the solder pad is positioned between the substrate and the deformable substrate;
    a carbon nanotube layer disposed on the deformable substrate and comprising an upper surface and a lower surface opposite to the upper surface, wherein the deformable substrate is disposed under the lower surface;
    a plurality of parallel metallic column electrodes patterned on the upper surface of the carbon nanotube layer;
    a plurality of parallel metallic row electrodes patterned on the lower surface of the carbon nanotube layer, wherein the plurality of parallel metallic column electrodes and the plurality of parallel metallic row electrodes are spaced to perpendicularly intersect, the carbon nanotube layer within each spaced perpendicularly intersecting region constitutes a pressure sensor unit of the pressure sensor;
    a cover plate disposed on the upper surface of the carbon nanotube layer and being made of one or more elastic materials;
    two flexible circuit boards connecting the carbon nanotube layer and the substrate base; and
    a processor,
    wherein the carbon nanotube layer is deformed when an external physical pressure is experienced by the cover plate, causing variations in resistance to generate in the pressure sensor unit at a point of contact of the external physical pressure and variations in capacitance to generate between the carbon nanotube layer and the solder pad, the processor calculates a resistance variation value in the pressure sensor unit at the point of contact of the external physical pressure and a capacitance variation value between the carbon nanotube layer and the solder pad, the external physical pressure comprises a lateral pressure which is parallel to the cover plate, the processor further calculates the lateral pressure at the point of contact of the external physical pressure in accordance with the resistance variation value and the capacitance variation value.

2. The pressure sensor of claim 1, further comprising a resistance measurement device and a capacitance measurement device, wherein the resistance measurement device measures the variations in resistance in the pressure sensor unit at the point of contact of the external physical pressure, and the capacitance measurement device measures the variations in capacitance between the carbon nanotube layer and the solder pad.

3. The pressure sensor of claim 1, wherein the plurality of parallel metallic column electrodes and the plurality of parallel metallic row electrodes are electrically connected to the substrate through a plurality of wires.

4. The pressure sensor of claim 1, wherein a distance between each of the plurality of parallel metallic column electrodes and each of the plurality of parallel metallic row electrodes is constant.

5. The pressure sensor of claim 1, wherein the deformable substrate is made of polydimethylsiloxane, silicone resin, or rubber.

6. The pressure sensor of claim 1, wherein the cover plate is made of polyethylene terephthalate or thin glass composition.

7. The pressure sensor of claim 1, wherein a thickness of each of the plurality of parallel metallic column electrodes is 25 microns to 65 microns, and a thickness of each of the plurality of parallel metallic row electrodes 36 is 25 microns to 65 microns.

8. The pressure sensor of claim 1, wherein the carbon nanometer layer is made of a composite material, the composite material comprises a polymer matrix material and carbon nanotubes distributed in the polymer matrix material, a mass ratio of the carbon nanotubes to the polymer matrix material is (0.1~15): 100.

9. The pressure sensor of claim 1, wherein the two flexible circuit boards are positioned on the upper surface of the carbon nanotube layer and electrically connected to the carbon nanotube layer and the substrate base.

10. The pressure sensor of claim 9, wherein the substrate base further comprises a connector and a plurality of solder joints, one end of each two flexible circuit boards is electrically connected to the upper surface of the carbon nanotube layer, and the other end of each flexible circuit boards is electrically connected to the connector or the plurality of solder joints.

11. The pressure sensor of claim 1, wherein the external physical pressure further comprises a vertical pressure, $F_v$, which is perpendicular to the lateral pressure, the processor calculates the vertical pressure $F_v$ based on the resistance variation value, and calculate the lateral pressure, $F_L$, based on the capacitance variation value and the vertical pressure $F_v$.

12. The pressure sensor of claim 11, wherein the processor calculates a distance variation value, $\Delta d$, between the carbon nanotube layer and the solder pad according to an equation:

$$\Delta C \varepsilon S(1/d - 1/[d-\Delta d])$$

wherein $\Delta C$ denotes the capacitance variation value, S denotes an area of the carbon nanotube layer, d denotes an original distance between the carbon nanotube layer and the solder pad;

wherein a pressure sensing area of the carbon nanotube layer is divided into four square areas with same size and shape, coordinates of nine end points of the four square areas are (0,0), (0,1), (1,0), (−1,0), (0,−1), (1,1), (1, −1), (−1,1) and (−1,−1), coordinate of a central point of the pressure sensing area is (0,0), different distance variation values $\Delta d$ correspond to heights of nine end points, the processor further substitutes the coordinates of the nine end points into an equation $d_i=F_i(x,y)=A_0x^2+C_0x+D_0y=E_0$, to obtain values of $A_0$, $B_0$, $C_0$, $D_0$ and $E_0$;

the processor further calculates a trajectory equation $F_i(x,y)=A_1x^2+B_1y^2+C_1x+D_1y+E_1$, for a trajectory of each end point, to obtain values of $A_1$, $B_1$, $C_1$, $D_1$ and $E_1$ as a solution of $A_0$, $B_0$, $C_0$, $D_0$ and $E_0$;

the processor further calculates a tangent equation of the trajectory equation by derivation:

$$F_i'(x,y)=2 A_1x+2 B_1y+C_1+D_1$$

the processor further calculates a slope k of a tangent line of tangent equation:

$k = \tan\alpha = -B_1/A_1$ where $\alpha$ denotes a tilt angle of the tangent equation in Cartesian coordinate system;

the processor further calculates a magnitude and a direction of the lateral pressure $F_L$ by $\tan\alpha$ and the vertical force $F_v$:

$F_L = -A_1/B_1 \cdot F_v$.

* * * * *